March 23, 1926.  1,577,878

C. E. STALSBERG

POULTRY DRINKING FOUNTAIN

Filed Dec. 17, 1924

INVENTOR
Christian E. Stalsberg

Patented Mar. 23, 1926.

1,577,878

UNITED STATES PATENT OFFICE.

CHRISTIAN E. STALSBERG, OF GARDEN HOME, OREGON.

POULTRY DRINKING FOUNTAIN.

Application filed December 17, 1924. Serial No. 756,515.

*To all whom it may concern:*

Be it known that I, CHRISTIAN E. STALSBERG, a citizen of the United States, residing at Garden Home, in the county of Washington and State of Oregon, have invented a new and useful Poultry Drinking Fountain, of which the following is a specification.

The invention relates to improvements in a poultry drinking fountain in which an inverted glass jar or metal tank is used as a reservoir, discharging the drinking fluid into a drinking pan below as consumed.

The objects of the improvements are, first: to provide a metal device to support the inverted jar, so constructed that the bottom of the pan may act as a cover for the jar while the fountain is being turned over to prevent the fluid from spilling.

Second: To provide some means whereby said jar may then be elevated and held in a proper height to permit the fluid freely to escape into the drinking pan below.

Third: So that the fountain can be used with equal satisfaction for both small chicks and mature fowls.

Fourth: Some means to conveniently carry the fountain and hang it up that will not interfere with its operation and be out of the chicks' way.

Fifth: To prevent the chicks from perching on the fountain.

The accompanying drawing illustrates by what means I have attained these several objects.

Figure 1:
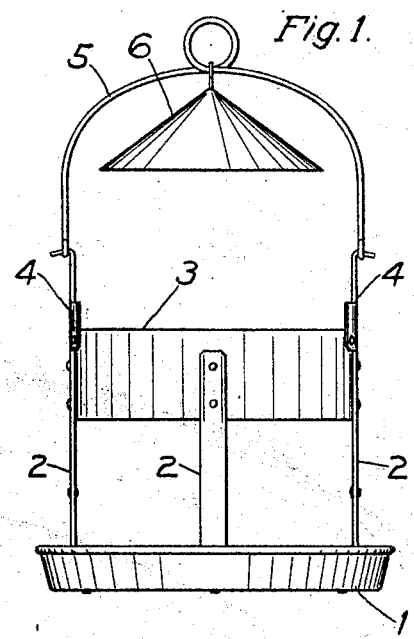
Fig. 1 illustrates the metal device used to support the jar without the chick guard.
Figure 2:
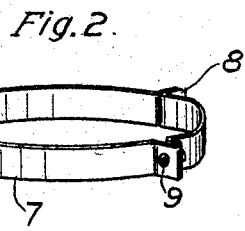
Fig. 2 shows a metal band which is clamped around the jar and by which it is held in position.
Figure 3:
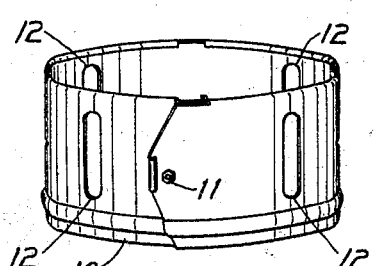
Fig. 3 is a metal cylinder named the chick guard.

The drinking pan (1) forms the base of the device. To the bottom of which are securely fastened the lower ends of four uprights or standards 2. 2. 2. 2. A circular metal collar (3) having a diameter slightly larger than the jar to be used are riveted to the upper ends of the uprights 2. 2. 2. 2. Brackets 4. 4. are riveted to the collar (3) at two opposite points.

The bail (5) has oblong loops at the ends which slips over the center extensions of brackets 4. 4.

The conical metal cap (6) is suspended by a wire attached to the bail (5).

The chick guard (10) is a metal cylinder, the ends of which are held together by a bolt (11). The narrow oblong openings 12. 12. 12. 12 are so that the caretaker may see at a distance when the jar is empty.

These constitute the supporting device, lugs 8. 8. at two opposite points of the band (7) are for the purpose of elevating the inverted jar and holding it in that position. The bolt (9) is to tighten the band when clamped around the jar.

The band (7) is clamped around the jar in such a position, that when the supporting device is placed over the jar, the bottom of pan (1) resting on the mouth of the jar, the lugs 8. 8. will be in contact with the edge of the collar (3).

Figure 4:
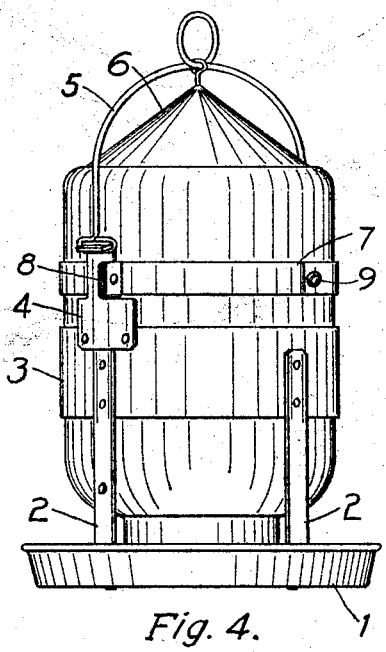
Fig. 4 shows the fountain without the chick guard as it is used for full grown poultry.
Figure 5:
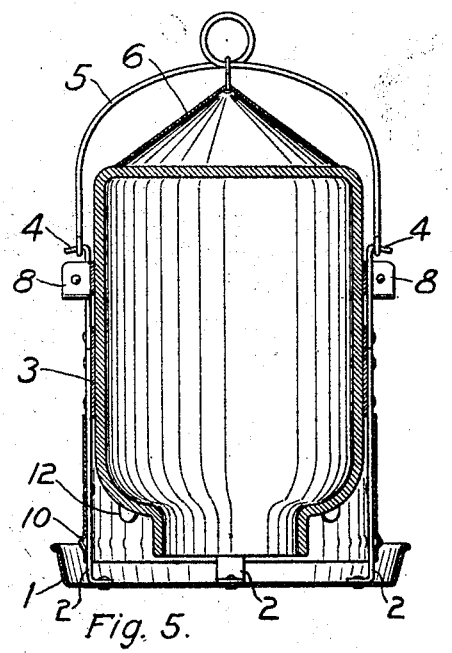
Fig. 5 illustrates a vertical cross section of the complete fountain with the chick guard in its proper position, as it is used for small and growing chicks.

The fountain is operated as follows: The jar is filled in the usual way, the supporting device with the bail and cap removed is placed on the jar in a position, so that the brackets 4. 4 are beside and close to the projections 8. 8. The fountain is then turned over. The bail with the cap replaced and the fountain in this position carried to its proper place. The operator then places the thumbs on the bent center extension of brackets 4. 4. the index fingers under lugs 8. 8. and slowly elevates the jar turning it, so that the lugs 8. 8. rests on brackets 4. 4. as shown in Fig. 4 and Fig. 5.

I am aware that fountains are now in use, that use an inverted glass jar or metal tank as a reservoir and a drinking pan underneath, and I therefore do not claim such a combination broadly, but—

I claim:

1. A poultry drinking fountain, comprising a pan, upright standards having their lower ends secured to said pan, a circular collar secured to the upper ends of said standards, an invertible reservoir removably disposed within said collar, and a supporting band, having outstanding lugs, adjustably secured about said reservoir.

2. A poultry drinking fountain, comprising a pan, upright standards mounted on said pan, a circular collar attached to the upper ends of said standards, an invertible reservoir disposed within said circular collar, means to support said reservoir within said collar, comprising a supporting band detachably secured about said reservoir and having outstanding lugs disposed thereon, said lugs resting upon and being supported by the upper edge of said circular collar, and means permitting said reservoir being supported in a raised position, comprising brackets attached to said circular collar, having shoulders thereon adapted to receive and support said outstanding lugs.

3. A poultry drinking fountain, comprising a pan, upright standards secured to said pan at their lower ends, a circular collar secured to the upper ends of said upright standards, shouldered brackets oppositely secured to said circular collar, an invertible reservoir, a detachable supporting band, having outstanding spaced lugs, secured about said reservoir, and adapted, when said lugs rest upon said shouldered brackets, to support said reservoir in a suspended position within said circular collar, and a detachable cylindrical chick guard disposed about and adjacent the lower ends of said upright standards.

4. A poultry drinking fountain, comprising a pan, upright standards secured to said pan at their lower ends, a circular collar secured to the upper ends of said upright standards, shouldered brackets oppositely mounted upon said collar and adjacent its upper edge, a reservoir slidably maintained within said circular collar, a supporting band detachably secured about said reservoir, said supporting band having outwardly and oppositely positioned lugs on the outer periphery thereof, said lugs adapted when positioned upon said shouldered brackets, to support said reservoir in a suspended position within said circular collar, a detachable cylindrical guard having slotted holes therein, disposed about and adjacent the lower ends of said upright standards, a bail removably secured to said shouldered brackets, and means to prevent fowls from roosting upon said reservoir, comprising a conical cap suspended from said bail and above said reservoir.

CHRISTIAN E. STALSBERG.